(12) United States Patent
Maheshwari et al.

(10) Patent No.: US 11,632,369 B2
(45) Date of Patent: Apr. 18, 2023

(54) METHOD AND SYSTEM FOR AUTHENTICATION OF CONNECTED DEVICE TRANSACTIONS

(71) Applicant: MASTERCARD INTERNATIONAL INCORPORATED, Purchase, NY (US)

(72) Inventors: Nishant Maheshwari, Delhi (IN); Shreya Mittal, Delhi (IN); Shubham Bijawat, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 292 days.

(21) Appl. No.: 16/260,318

(22) Filed: Jan. 29, 2019

(65) Prior Publication Data
US 2020/0244654 A1 Jul. 30, 2020

(51) Int. Cl.
*H04L 9/40* (2022.01)
*G06Q 20/38* (2012.01)
*H04W 12/02* (2009.01)
*G06F 21/62* (2013.01)

(52) U.S. Cl.
CPC ...... *H04L 63/0876* (2013.01); *G06F 21/6245* (2013.01); *G06Q 20/382* (2013.01); *H04W 12/02* (2013.01)

(58) Field of Classification Search
CPC .......... H04L 63/0876; G06Q 20/382; G06Q 20/027; G06Q 20/401; G06Q 20/409; G06Q 2220/00; H04W 12/02; H04W 12/63; H04W 12/65; H04W 12/71; H04W 12/033; G06F 21/6245; G06F 21/606; G06F 21/44
See application file for complete search history.

(56) References Cited

U.S. PATENT DOCUMENTS

| | | | |
|---|---|---|---|
| 9,275,389 B1 * | 3/2016 | Dides | G06Q 20/341 |
| 10,929,841 B1 * | 2/2021 | Kalaboukis | G06Q 20/322 |
| 2014/0269614 A1 * | 9/2014 | Maguire | H04L 65/80 |
| | | | 370/331 |
| 2015/0089568 A1 * | 3/2015 | Sprague | H04L 63/06 |
| | | | 726/1 |
| 2015/0134513 A1 * | 5/2015 | Olson | G06K 19/06206 |
| | | | 705/39 |
| 2019/0004489 A1 * | 1/2019 | Stagg | G05B 19/0425 |

* cited by examiner

*Primary Examiner* — Henry Tsang
(74) *Attorney, Agent, or Firm* — Panitch Schwarze Belisario & Nadel LLP

(57) ABSTRACT

A method for using the active connection of connected devices for additional security in the conveyance of sensitive data from a computing device includes: storing sensitive data; storing one or more device identifiers, wherein each device identifier is associated with a connected device separate from the computing device; receiving a user instruction requesting use of the sensitive data; detecting one or more active communication channels between the computing device and external connected devices; identifying, for each of the detected one or more active communication channels, a device identifier associated with the respective external connected device; verifying that at least one of the identified device identifiers is included in the one or more stored device identifiers; and transmitting the sensitive data after the verification.

16 Claims, 6 Drawing Sheets

METHOD AND SYSTEM FOR AUTHENTICATION OF CONNECTED DEVICE TRANSACTIONS

FIELD

The present disclosure relates to the use of active connections to connected devices for additional security in authentication for the transmission of sensitive data from a computing device, specifically requiring that a certain number of pre-registered connected devices are actively connected to the computing device before sensitive data may be transmitted from the computing device to an external device.

BACKGROUND

Computing devices are often used by users to store sensitive data that may need to be transmitted to other devices from time to time. For example, many uses use smart phones or other computing devices to store payment credentials that are conveyed to a point of sale for a payment transaction. The use of computing devices for such functions can provide users with a level of convenience. In an effort to maintain this convenience, but maintain a high level of security, many services will utilize one-time passwords when sensitive data is to be used. For instance, in the above example, the issuing financial institution for a transaction account may send a one-time password to the user via a short messaging service message, which the user must enter into an application program to enable use of the payment credentials.

However, if the user's computing device is stolen or otherwise compromised, this added layer of protection will do little to stop the nefarious actor, as the nefarious actor already has the user's device and will thus receive the one-time password on that same device for entry therein. Thus, there is a need for an alternative method to provided added security and authentication when sensitive data is to be transmitted from a computing device.

Many such methods often require the user to provide additional data and information when attempting to use the sensitive data. For instance, one method requires the user to provide biometric data, such as a fingerprint or retinal scan, each time the sensitive data is to be used. In another method, the user must type in a personal identification number (PIN) when the sensitive data is to be used. In either instance, the user must take additional action when using the sensitive data. For some users, the additional security is not worth the lack of convenience in having to perform any additional actions. Thus, there is a need for an alternative method to provide increased security for the use of sensitive data, but without requiring additional actions to be performed at the time of use by the user, thus maintaining a high level of user convenience.

SUMMARY

The present disclosure provides a description of systems and methods for using the active connection of connected devices for additional security in the conveyance of sensitive data from a computing device. When connected devices are paired with a computing device for the first time (or subsequent times at the request of the user), the user may register that connected device for use as authentication in the use of sensitive data. When the user wants to use sensitive data in the computing device, the computing device checks for a predetermined number of active connections to registered connected devices. If the number is not met, then the sensitive data cannot be used, or alternatively, other methods of second factor authentication (e.g., biometrics, one time passcodes, can be activated that might be more computationally burdensome but provide a suitable level of protection. The result is that the user must have a sufficient number of connected devices present and actively connected to the computing device. In cases where a computing device gets stolen, the likelihood of sufficient numbers of connected devices being stolen along with the computing device is low, with the likelihood that the thief will continue to possess and actively use the connected devices alongside the computing device being even lower. Thus, there is a higher level of security in the use of sensitive data by the computing device. At the same time, the user needs to do nothing more than use their connected devices as normal to gain this additional level of security, which thus does not impact their convenience.

A method for using the active connection of connected devices for additional security in the conveyance of sensitive data from a computing device includes: storing, in a computing device, sensitive data; storing, in a memory of the computing device, one or more device identifiers, wherein each device identifier is associated with a connected device separate from the computing device; receiving, by an input device interfaced with the computing device, a user instruction requesting use of the sensitive data; detecting, by a processing device of the computing device, one or more active communication channels between the computing device and external connected devices; identifying, for each of the detected one or more active communication channels, a device identifier associated with the respective external connected device; verifying, by the processing device of the processing server, that at least one of the identified device identifiers is included in the one or more stored device identifiers; and transmitting, by a transmitter of the computing device, the sensitive data after the verification.

Another method for using the active connection of connected devices for additional security in the conveyance of sensitive data from a computing device includes: storing, in a computing device, sensitive data and an identifier associated with the computing device; receiving, by an input device interfaced with the computing device, a user instruction requesting use of the sensitive data; detecting, by a processing device of the computing device, one or more active communication channels between the computing device and external connected devices; identifying, for each of the detected one or more active communication channels, a device identifier associated with the respective external connected device; receiving, by a receiver of the computing device, blockchain data for a blockchain, wherein the blockchain data includes at least one or more blockchain data entries, each blockchain data entry including at least the identifier associated with the computing device and a connected device value; verifying, by the processing device of the processing server, that at least one of the identified device identifiers corresponds to a connected device value included in one of the one or more blockchain data entries; and transmitting, by a transmitter of the computing device, the sensitive data after the verification.

A system for using the active connection of connected devices for additional security in the conveyance of sensitive data from a computing device includes: a computing device configured to store sensitive data; a memory of the computing device configured to store one or more device identifiers, wherein each device identifier is associated with a connected device separate from the computing device; an input device interfaced with the computing device configured to receive a user instruction requesting use of the sensitive data; a processing device of the computing device configured to detect one or more active communication channels between the computing device and external connected devices, identify, for each of the detected one or more active communication channels, a device identifier associated with the respective external connected device, and verify that at least one of the identified device identifiers is included in the one or more stored device identifiers; and a transmitter of the computing device configured to transmit the sensitive data after the verification.

Another system for using the active connection of connected devices for additional security in the conveyance of sensitive data from a computing device includes: a computing device configured to store sensitive data and an identifier associated with the computing device; an input device interfaced with the computing device configured to receive a user instruction requesting use of the sensitive data; a receiver of the computing device configured to receive blockchain data for a blockchain, wherein the blockchain data includes at least one or more blockchain data entries, each blockchain data entry including at least the identifier associated with the computing device and a connected device value; a processing device of the computing device configured to detect one or more active communication channels between the computing device and external connected devices, identify, for each of the detected one or more active communication channels, a device identifier associated with the respective external connected device, and verify that at least one of the identified device identifiers corresponds to a connected device value included in one of the one or more blockchain data entries; and a transmitter of the computing device configured to transmit the sensitive data after the verification.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Figure 1:
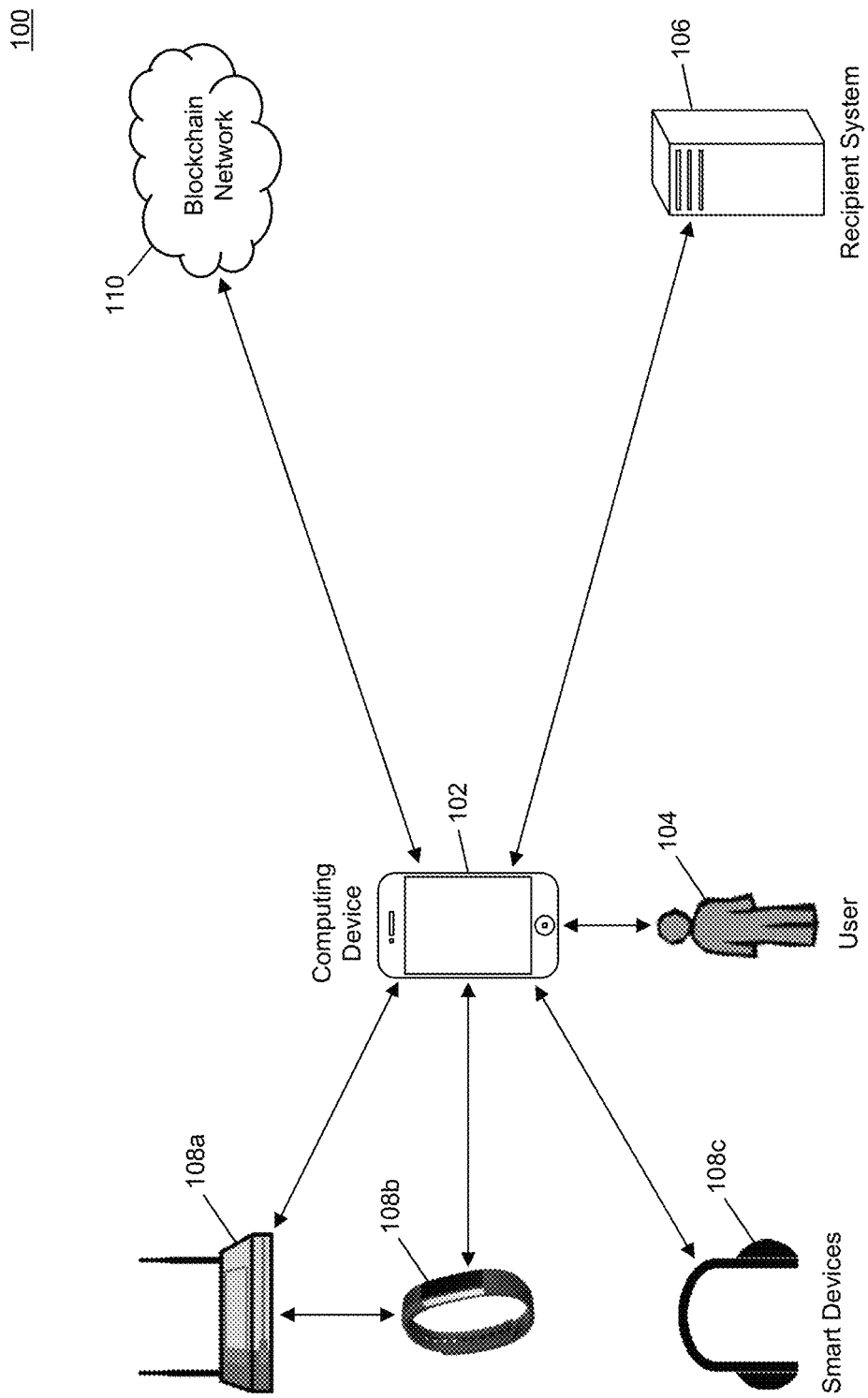
FIG. 1 is a block diagram illustrating a high level system architecture for the use of active connections of connected devices for additional security in the use of sensitive data in accordance with exemplary embodiments.

System for the Use of Active Connections to Connected Devices in Sensitive Data Transmission FIG. 1 illustrates a system 100 for the use of active connections to connected devices in the transmission of sensitive data from a computing device to provide for a greater level of security to the computing device's user without impacting user convenience.

The system 100 may include a computing device 102. The computing device 102, discussed in more detail below, may store sensitive data and may be configured to require active connections to one or more connected devices 108, illustrated in FIG. 1 as connected devices 108a, 108b, and 108c, before sensitive data may be transmitted from the computing device 102. The computing device 102 may be any type of device that can be specially configured to perform the functions discussed herein, such as a specially configured desktop computer, laptop computer, notebook computer, tablet computer, cellular phone, smart phone, smart watch, smart television, wearable computing device, implantable computing device, etc.

In the system 100, a user 104 may use the computing device 102 for the storage and transmission of sensitive data. The sensitive data can be any data that the user 104 may want to have a higher level of security for than other data that is stored on and used by the computing device 102. For instance, in one example, the sensitive data may be payment credentials associated with a transaction account that are provided to a merchant for use in funding an electronic payment transaction using the associated transaction account. In another example, the sensitive data may be confidential documents, such as attorney-client communications, attorney work product, medical records, classified information, trade secrets, etc. The user 104 may have a desire to transmit the sensitive data to a recipient system 106, or download the sensitive data from the recipient system 106 to the computing device 102. The recipient system 106 may be an external computing system that may receive and/or sent data transmissions from the computing device 102. In the first above example, the recipient system 106 may be a point of sale system that is to receive the payment credentials for use in a payment transaction. In the other examples, the recipient system 106 may be a client or another attorney to whom that the user 104 is transmitting attorney work product or client confidential information, for example. Transmissions may be made between the computing device 102 and recipient system 106 using any suitable communication network and method, such as the Internet, Bluetooth, radio frequency, a local area network, near field communication, wide area network, etc.

The user 104 may pair a plurality of connected devices 108 to the computing device 102. Herein, a device is a connected device if it has its own identifier, is generally separate from the computing device and connected by a communications channel to the computing device such as by short range wireless transceivers, other wireless (radio, optical, inductive, etc.) protocols, wired connections, contact pads, etc. that implies the two devices are in close proximity (e.g., on a person or within a room or house, depending on type of device). Connected devices 108 may be any electronic device that can establish and maintain an active communication channel with the computing device 102 using any suitable communication method, such as Bluetooth, radio frequency, near field communication, etc. Connected devices 108 may include, for example, health tracking devices, headphones, wireless routers, smart televisions, smart watches, implantable devices, automobiles, other computing devices 102, etc. During the pairing process between a connected device 108 and the computing device 102, or at a later time as instructed by the user 104, the user 104 may register a paired connected device 108 for use in authentication for the transmission of the sensitive data. When a connected device 108 is registered, the computing device 102 may store a device identifier associated with the connected device 108 in a profile to be used for the authentication. The device identifier may be a unique identifier that is unique to the connected device 108 among all other potential connected devices. The unique identifier may be, for instance, a media access control address, registration number, serial number, or other suitable value.

The computing device 102 may store the device identifier for every connected device 108 registered by the user 104 for use in the authentication process. When the user 104 instructs the computing device 102 (e.g., via an input device interfaced therewith) that the sensitive data is to be transmitted to the recipient system 106, the computing device 102 may detect all of the connected devices 108 that are actively connected to the computing device 102 via an active communication channel. The computing device 102 may identify each of the connected devices 108 (e.g., through the respective device identifiers) and determine if a suitable number of registered connected devices 108 are currently connected to the computing device 102. The suitable number may be set by the user 104, the computing device 102, an entity related to the sensitive data being used, or other entity. For example, the user 104 or another authority (e.g., the party supplying the sensitive data such as law firm, medical practice, financial institution, etc.) may set the suitable number of connected devices 108 to be two, or a ratio (two out of four, or other convention suitable for the level of security desired. Different data sets can be distributed based on the level of security as measure but the number of connected devices 108 presently connected to the computing device 102.

If the predetermined number of registered connected devices 108 are actively connected to the computing device 102, then the computing device 102 may transmit the sensitive data to the recipient system 106 using a suitable communication method. If the number of registered connected devices 108 actively connected to the computing device 102 does not meet the predetermined number, then the sensitive data may not be used. In some cases, the computing device 102 may display an error message to the user 104, such as informing the user that additional registered connected devices 108 must be connected. In some instances, such a message may indicate the number of connected devices 108 necessary to reach the predetermined number. In these cases, the user 104 may quickly connect another connected device 108 and try the process again. Another alternative is that other, more computationally and manually burdensome two or more factor authentication methods can be imposed before transmission.

In some cases, the predetermined number may be less than the number of connected devices 108 that are registered. For example, the user 104 may require that only two connected devices 108 be connected to the computing device 102 for use of the sensitive data, but may register five different connected devices 108 with the computing device 102: headphones, a smart watch, a wireless router, a smart television, and a car. Requiring only two for transmission of the sensitive data may provide convenience for the user 104, who may not use their smart watch or headphones while at home but instead have the wireless router and smart television on, or, when using a drive thru at a restaurant, may be connected to the car and their smart watch but not be using their headphones.

In some embodiments, the device identifiers for the registered connected devices 108 may be stored remotely from the computing device 102. For instance, an external database may be used to maintain a listing of registered device identifiers for the computing device 102, which may be used to regularly update the computing device's own list or referenced any time the sensitive data is to be used. In these embodiments, the computing device 102 may communicate with the external database using any suitable communication network and method.

In one such embodiment, the external database may be a blockchain. The blockchain may be managed by a blockchain network 110. The blockchain network 110 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 110 prior to the generation and addition of a new block to the blockchain in order for the change to be made permanent. Computational and communication limitations may make such a modification exceedingly difficult, if not impossible, thus rendering the blockchain immutable.

Each blockchain data value may correspond to the registration of a new connected device 108 for the computing device 102 or cancellation of a previously registered connected device 108. Each blockchain data value may include at least the device identifier associated with the respective connected device 108, as well as an identifier or other value unique to the computing device 102. For instance, the value may be a device identifier associated with the computing device 102 (e.g., a media access control address). In some cases, a single blockchain may be associated with only a single computing device 102. In such cases, each blockchain data value may only include the device identifier for the connected device 108 without an identifier for the computing device 102. A blockchain data entry may also include a flag indicating if the entry is for the registration of a new connected device 108 or cancellation of an existing registration (e.g., if the user 104 is replacing the connected device 108).

In some cases, the computing device 102 may have a cryptographic key pair associated therewith, where the cryptographic key pair is comprised of a private key and a public key. In such cases, the public key may be used as the identifier associated with the computing device 102. When submissions for the registration of new connected devices 108 or cancellation of existing registrations is made, the computing device 102 may generate a digital signature using the private key. A node in the blockchain network 110 may receive the submission of the device identifier for the connected device 108, indication of registration or cancellation, and the digital signature. The node may then use the public key of the computing device's cryptographic key pair to validate the digital signature. Only if validation of the digital signature is successful will the new blockchain data entry be created and added to the blockchain. The use of a blockchain to manage the profile of device identifiers for registered connected devices 108 may provide a greater level of security by having device identifiers not stored locally on the computing device 102, which may enable the user 104 to use multiple, different computing devices 102 (e.g., both a home desktop computer and a smart phone) for the transmission of sensitive data while still requiring active connections to registered connected devices 108.

The methods and systems discussed herein provide for the use of active connections to connected devices 108 by a computing device 102 for the use of sensitive data stored therein. By using active connections to connected devices 108 for authentication, the sensitive data may be protected from use even in cases where the computing device 102 is lost or stolen. In addition, if the user 104 registers connected devices 108 already commonly used by the user 104, the authentication may be effective without requiring any additional actions to be performed by the user 104 when accessing the sensitive data. Furthermore, enabling a minimum number of connected devices 108 for use while having additional connected devices 108 registered may provide the same security to the user 104 with greater convenience to enable use of the authentication in different situations for the user 104. The result is, overall, a higher level of authentication provided from existing systems, while also maintaining a high level of user convenience.

Computing Device

Figure 2:
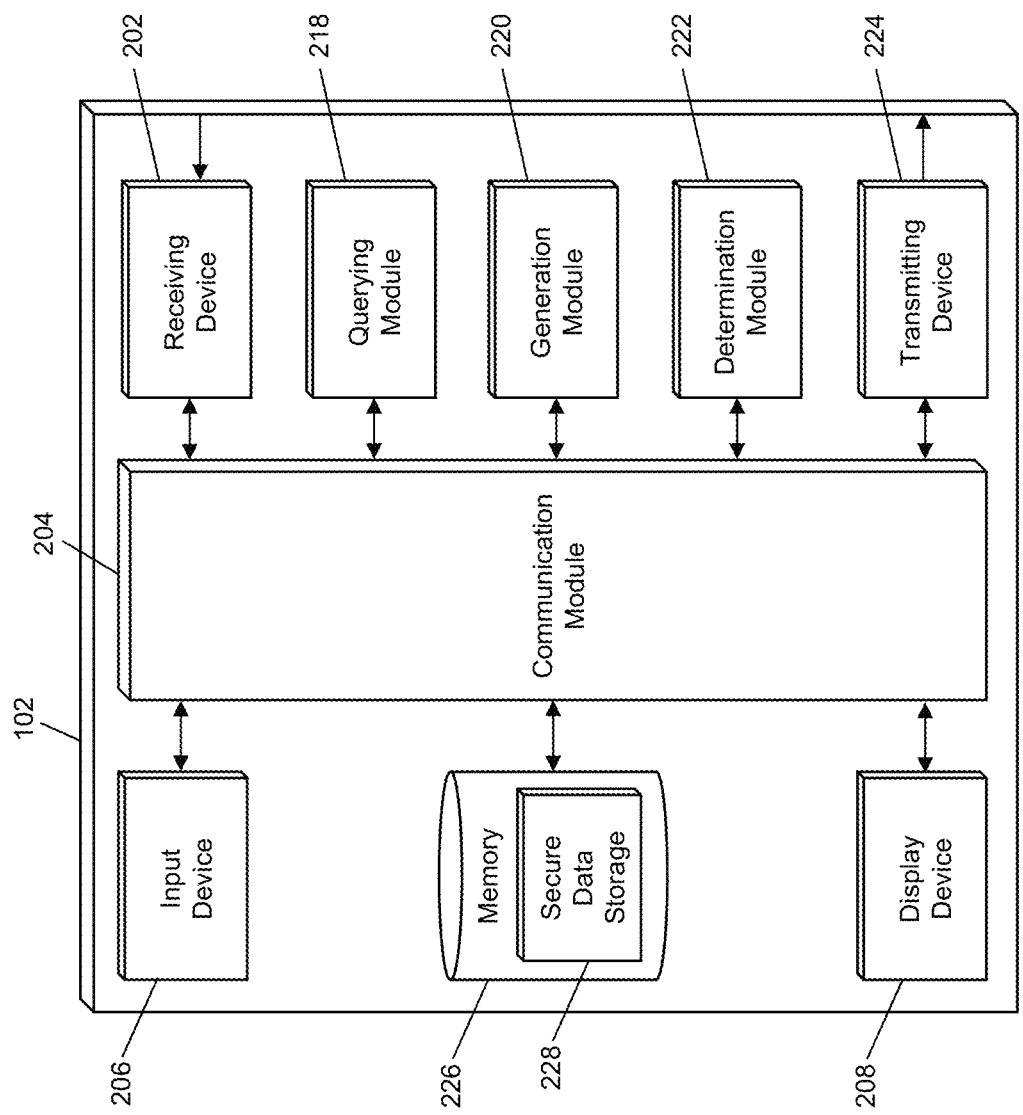
FIG. 2 is a block diagram illustrating the computing device of the system of FIG. 1 for using active connections to connected devices in the use of sensitive data in the computing device in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 600 illustrated in FIG. 6 and discussed in more detail below may be a suitable configuration of the computing device 102.

The computing device 102 may include a receiving device 202. The receiving device 202 may be configured to receive data over one or more networks via one or more network protocols. In some instances, the receiving device 202 may be configured to receive data from connected devices 108 and blockchain networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by connected devices 108 that are superimposed or otherwise encoded with data used in the operation and management of the connected devices 108. As part of the receipt of data signals from the connected devices 108, the receiving device 202 may receive a device identifier from the connected device 108 that is unique to the connected device 108. The receiving device 202 may also be configured to receive data signals electronically transmitted by nodes in the blockchain network 110, which may be superimposed or otherwise encoded with blockchain data, including blockchain, blockchain data entries, or other data for use in performing the functions discussed herein.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, determination module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may also include or be otherwise interfaced with one or more input devices 206. The input devices 206 may be internal to the computing device 102 or external to the computing device 102 and connected thereto via one or more connections (e.g., wired or wireless) for the transmission of data to and/or from. The input devices 206 may be configured to receive input from a user of the computing device 102, which may be provided to another module or engine of the computing device 102 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive an instruction by the user 104 to register a paired connected device 108 for use in authentication or an instruction for use of sensitive data that may initiate the authentication processed discussed herein.

The computing device 102 may also include or be otherwise interfaced with a display device 208. The display device 208 may be internal to the computing device 102 or external to the computing device 102 and connected thereto via one or more connections (e.g., wired or wireless) for the transmission of data to and/or from. The display device 208 may be configured to display data to a user of the computing device 102. The display device 208 may be any type of display suitable for displaying data as part of the functions discussed herein, such as a liquid crystal display, light emitting diode display, thin film transistor display, capacitive touch display, cathode ray tube display, light projection display, etc. In some instances, the computing device 102 may include multiple display devices 208. The display device 208 may be configured to, for example, display prompts to the user 104 for registration of a newly paired connected device 108, error messages regarding failed authentications, etc.

The computing device 102 may include a querying module 218. The querying module 218 may be configured to execute queries on databases to identify information. The querying module 218 may receive one or more data values or query strings, and may execute a query string based thereon on an indicated database, such as a memory 226, to identify information stored therein. The querying module 218 may then output the identified information to an appropriate engine or module of the computing device 102 as necessary. The querying module 218 may, for example, execute a query on the memory 226 to identify registered device identifiers and a predetermined number of connected devices 108 that must be actively connected to the computing device 102 for authentication prior to transmission of sensitive data.

The computing device 102 may also include a generation module 220. The generation module 220 may be configured to generate data for use by the computing device 102 in performing the functions discussed herein. The generation module 220 may receive instructions as input, may generate data based on the instructions, and may output the generated data to one or more modules of the computing device 102. For example, the generation module 220 may be configured to generate notifications and other data messages for transmission to the display device 208 for display to the user 104, generate data submissions for a blockchain network 110 to register new connected devices 108, etc. In cases where a cryptographic key pair is used by the computing device 102, the generation module 220 may be configured to generate digital signatures using a private key of the computing device 102.

The computing device 102 may also include a determination module 222. The determination module 222 may be configured to make determinations for the computing device 102 as part of the functions discussed herein. The determination module 222 may receive an instruction as input, may make a determination based on that instruction, and may output a result of the determination to another module or engine of the computing device 102. The determination module 222 may, for example, be configured to determine how many connected devices 108 are actively connected to the computing device 102, the device identifier for each of the connected devices 108, and if the number of registered connected devices 108 that are actively connected to the computing device 102 is at least the predetermined number required for authentication.

The computing device 102 may also include a transmitting device 224. The transmitting device 224 may be configured to transmit data over one or more networks via one or more network protocols. In some instances, the transmitting device 224 may be configured to transmit data to recipient systems 106, connected devices 108, blockchain networks 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to connected devices 108 that may be superimposed or otherwise encoded with data used in the management or operation thereof, which may include a request for the device identifier associated with the respective connected device 108. The transmitting device 224 may also be configured to electronically transmit data signals to recipient systems 106 that are superimposed or otherwise encoded with sensitive data following a successful authentication process. In embodiments where the blockchain network 110 is used, the transmitting device 224 may be configured to electronically transmit data signals to nodes in the blockchain network 110 that are superimposed or otherwise encoded with new blockchain data entry submissions, which may include at least a device identifier for a connected device 108, an indication of registration or cancellation for the connected device 108, and, in some instances, an identifier or other value associated with the computing device 102, such as a device identifier, public key, and/or digital signature.

The computing device 102 may also include a memory 226. The memory 226 may be configured to store data for use by the computing device 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, registered device identifiers, a predetermined number for use in authentication, blockchain data, the sensitive data, program code for application programs used in the performing of functions discussed herein, etc.

In some embodiments, the memory 226 may include a secure data storage 228. The secure data storage 228 may be secure element, trusted execution environment, or other type of secured data storage where data stored therein may be inaccessible by the user 104 unless explicitly authorized. For instance, the secure data storage 228 may be a secure element where data stored therein is only accessible via a specific application program on the computing device 102, which may require the authentication process discussed herein to be performed prior to use of data stored therein. In such embodiments, the sensitive data that is to be transmitted to the recipient system 106 may be stored in the secure data storage 228.

Process for Registration of Connected Devices

Figure 3:
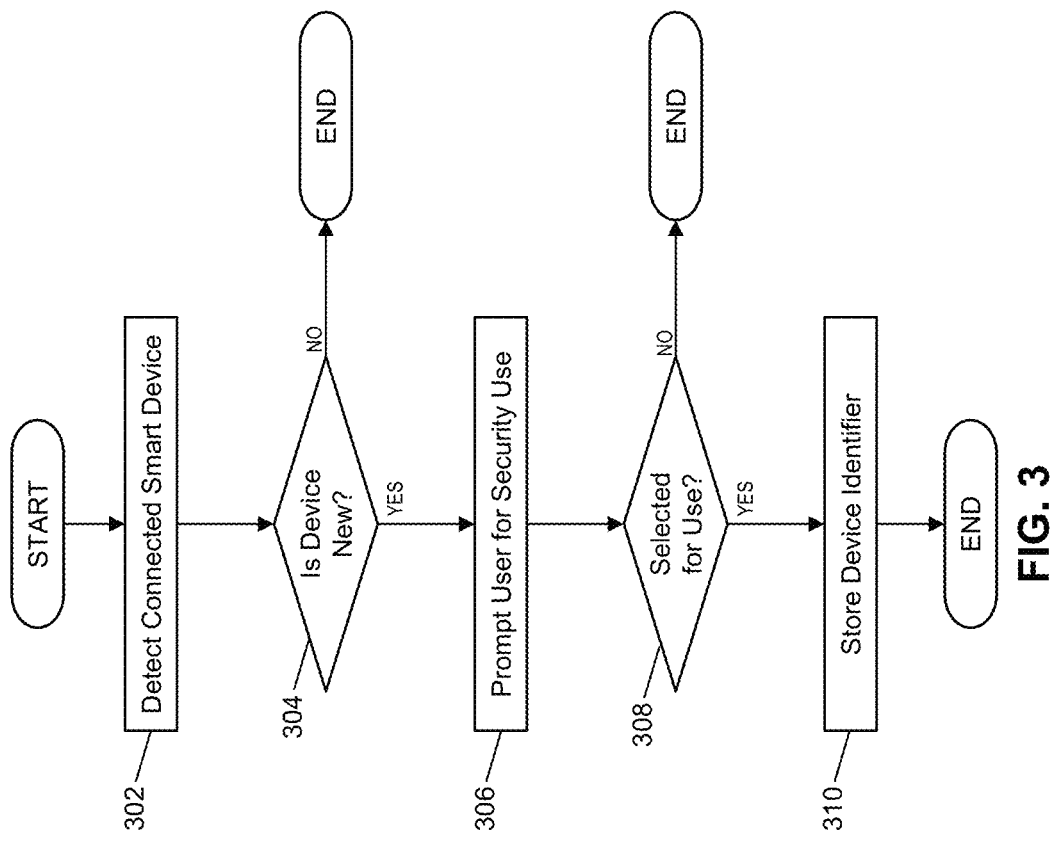
FIG. 3 is a flow diagram illustrating a process for the registration of a connected device for use in authentication of the use of sensitive data as executed by the computing device of FIG. 2 in accordance with exemplary embodiments.

FIG. 3 illustrates an example process 300 for the registration of connected devices 108 for use in the authentication process discussed herein used by the computing device 102 as executed by the computing device 102 for use in the system 100 of FIG. 1.

In step 302, the communication module 204 of the computing device 102 may detect a new active communication channel established with a connected device 108. In step 304, the determination module 222 may determine if the detected connected device 108 is new (e.g., this is the first pairing of the connected device 108 to the computing device 102). The determination may be based on data stored in the memory 226 of the computing device 102. For instance, once a connected device 108 has been paired, a profile associated therewith may be stored in the memory 226, such that if the profile exists when the connected device 108 is detected, then the connected device 108 may be determine to not be new. If the connected device 108 is not new, then the process 300 may complete.

If the connected device 108 is new, then, in step 306, the display device 208 interfaced with the computing device 102 may display a prompt to the user 104 asking the user 104 if they want to register the connected device 108 for use in the authentication process. The user 104 may respond to the prompt via input into the input device 206 interfaced with the computing device 102. In step 308, the determination module 222 may determine if the user 104 has selected the connected device 108 for use in the authentication processed based on the input received via the input device 206. If the user 104 does not want to register the connected device 108 for use in the authentication process, then the process 300 may be completed. If the user 104 wants to register the connected device 108, then, in step 310, the querying module 218 of the computing device 102 may execute a query on the memory 226 of the computing device 102 to store the device identifier for the detected connected device 108 therein.

Process for Authentication Via Active Connections to Connected Devices

Figure 4:
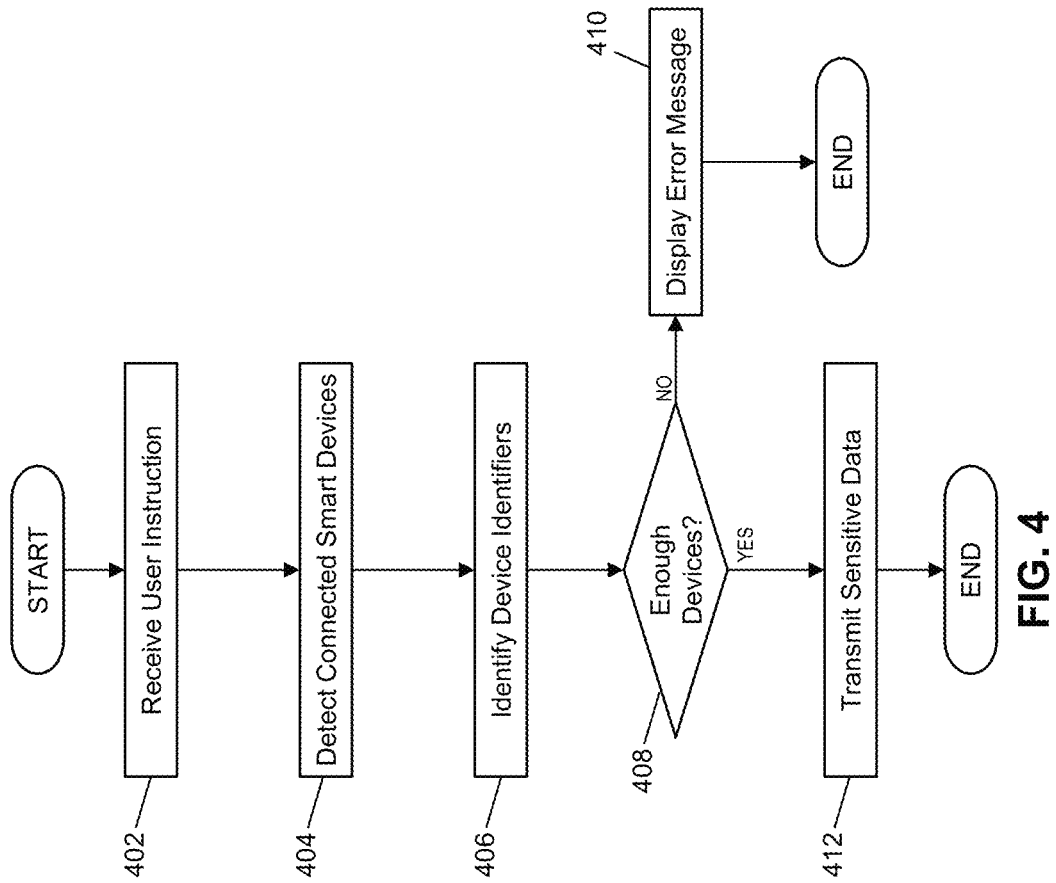
FIG. 4 is a flow diagram illustrating a process for the use of active connections to connected devices in the use of sensitive data as executed by the computing device of FIG. 2 in accordance with exemplary embodiments.

FIG. 4 illustrated an example process 400 executed by the computing device 102 in the system 100 of FIG. 1 for the use of active connections to connected devices 108 in the authentication of a user 102 for use in transmitting sensitive data to a recipient system 106.

In step 402, the input device 206 interfaced with the computing device 102 may receive a user instruction instructing that the sensitive data stored in the computing device 102 (e.g., in the memory 226 or secure data storage 228, as applicable) be transmitted to the recipient system 106. In step 404, the determination module 222 of the computing device 102 may detect the connected devices 108 that are actively connected to the computing device 102 via active communication channels between the respective connected devices 108 and the computing device 102. In step 406, the determination module 222 may identify the device identifier for each of the actively connected devices 108. It should be noted that the connected device 102 only need be connected and identified (e.g., it may not have to provide any data to the computing device 102).

In step 408, the determination module 222 of the computing device 102 may determine if there is a suitable number of registered connected devices 108 actively connected to the computing device 102. The determination may be based on the number of connected devices 108 actively connected to the computing device 102 that are registered, as identified via a comparison of device identifiers identified in step 406 with device identifiers registered for use in authentication as stored in the memory 226 (e.g., or the blockchain, if applicable), compared to the predetermined number of connected devices 108 that must be actively connected, which may be stored in the memory 226 of the computing device 102. If not enough registered connected devices 108 are connected, then, in step 410, the display device 208 interfaced with the computing device 102 may display an error message to the user 104 indicating that not enough registered connected devices 108 are currently actively connected to the computing device 102. If the predetermined number of registered connected devices 108 is met, then, in step 412, the transmitting device 224 of the computing device 102 may electronically transmit the sensitive data to the recipient system 106 using a suitable communication network and method.

Figure 5:
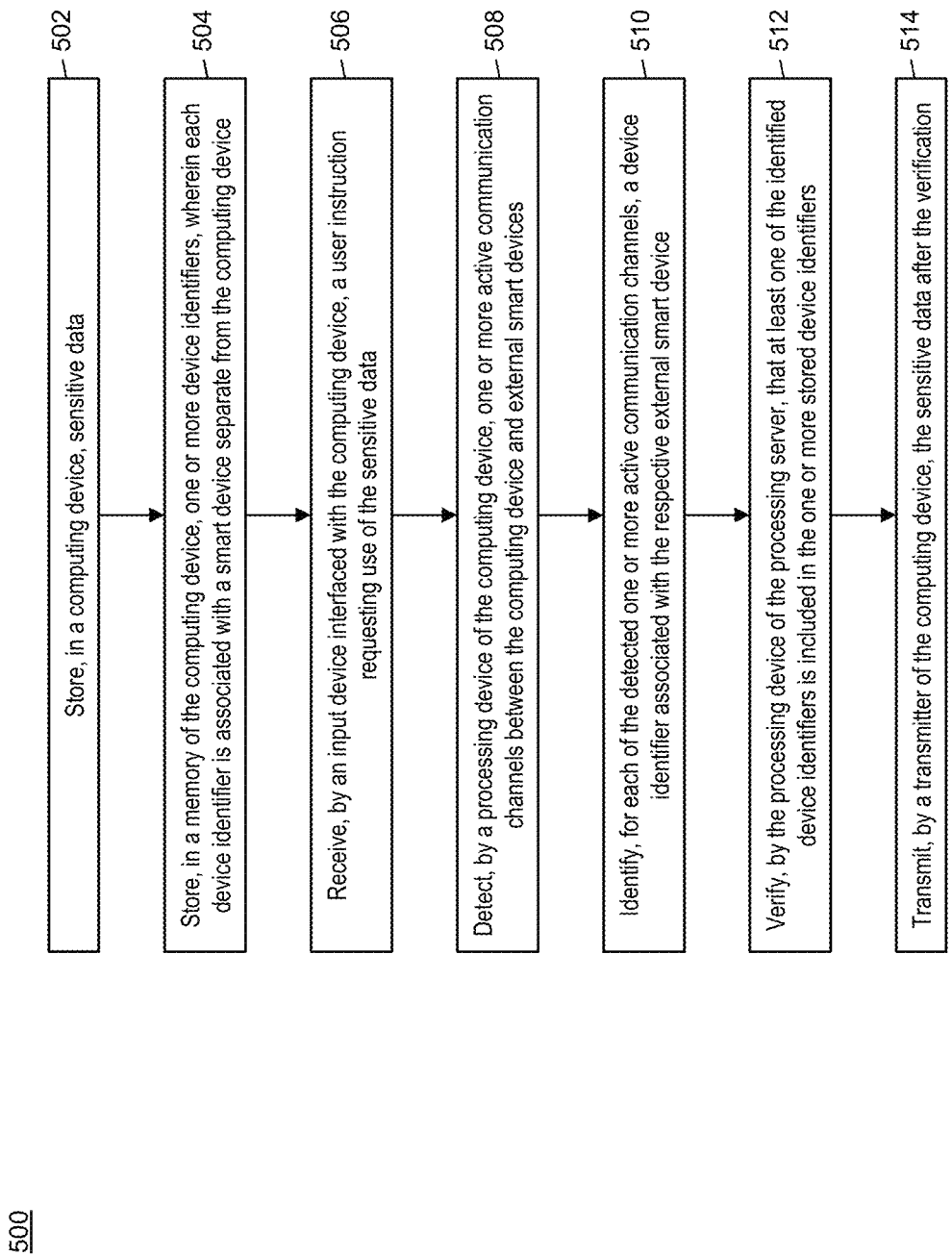
FIG. 5 is a flow chart illustrating an exemplary method for using the active connection of connected devices for additional security in the conveyance of sensitive data from a computing device in accordance with exemplary embodiments.

Exemplary Method for Using Active Connections to Connected Devices in Authentication FIG. 5 illustrates a method 500 for using the active connection of connected devices for additional security in the conveyance of sensitive data from a computing device to an external system.

In step 502, sensitive data may be stored in a computing device (e.g., the computing device 102). In step 504, one or more device identifiers may be stored in a memory (e.g., the memory 226) of the computing device, wherein each device identifier is associated with a connected device (e.g., a connected device 108) separate from the computing device. In step 506, a user instruction requesting use of the sensitive data may be received by an input device (e.g., the input device 206) interfaced with the computing device.

In step 508, one or more active communication channels between the computing device and external connected devices may be detected by a processing device (e.g., the determination module 222, communication module 204, etc.) of the computing device. In step 510, a device identifier associated with the respective external connected device may be identified for each of the detected one or more active communication channels. In step 512, the processing device (e.g., the determination module 222) of the processing server may verify that at least one of the identified device identifiers is included in the one or more stored device identifiers. In step 514, the sensitive data may be transmitted by a transmitter (e.g., the transmitting device 224) of the computing device after the verification.

In an alternative embodiment, the device identifiers may be stored in blockchain data entries in a blockchain. In such an embodiment, step 504 may include receiving, by a receiver (e.g., the receiving device 202) of the computing device, blockchain data for a blockchain, wherein the blockchain data includes at least one or more blockchain data entries, each blockchain data entry including at least the identifier associated with the computing device and a connected device value, where the verification in step 512 includes verifying, by the processing device of the processing server, that at least one of the identified device identifiers corresponds to a connected device value included in one of the one or more blockchain data entries.

In one embodiment, the method 500 may further include storing, in the memory of the computing device, a minimum number of connected devices, or a minimum number of connected devices for a given sensitivity indication of the information to be received that might be transmitted with the initial handshake between the computing device 102 and the recipient system 106, wherein the verification further includes verifying that a number of identified device identifiers included in the one or more stored device identifiers is at least the minimum number of connected devices. In some embodiments, the sensitive data may be stored in a secure element of the computing device. In one embodiment, the sensitive data may be stored in a trusted execution environment in the memory of the computing device.

In some embodiments, the sensitive data may be comprised of payment credentials associated with a transaction account used to fund electronic payment transactions. In one embodiment, the one or more active communication channels may use at least one of: Bluetooth, radio frequency, near field communication, and a local area network. In some embodiments, each of the one or more active communication channels may be detected upon establishment of the respective active communication channel between the computing device and the respective external connected device.

Computer System Architecture

Figure 6:
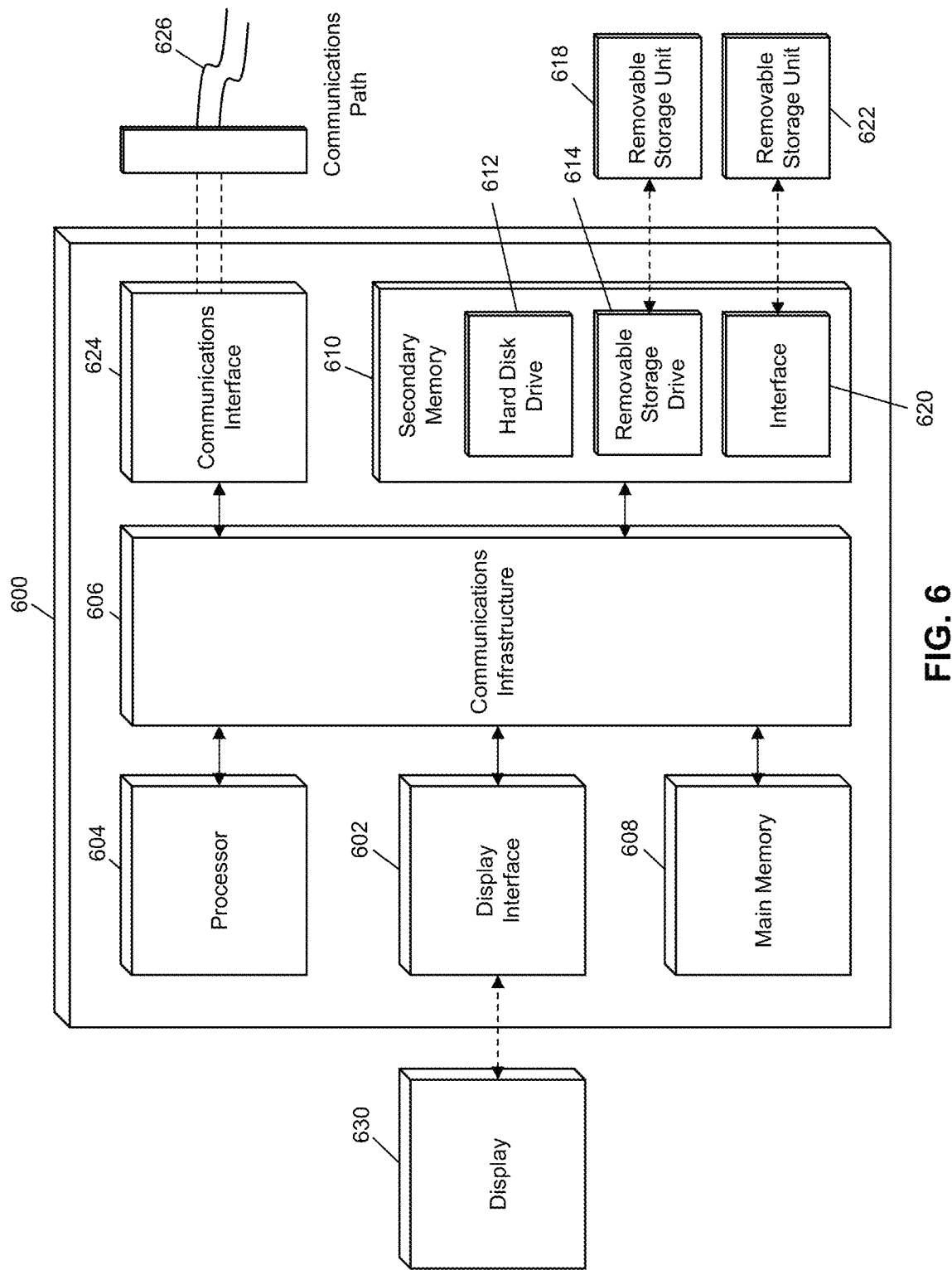
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the computing device 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for using the active connection of connected devices for additional security in the conveyance of sensitive data from a computing device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for using an active connection of connected devices for additional security in the conveyance of sensitive data from a computing device, comprising:
   storing, in a computing device, sensitive data, the sensitive data including a plurality of datasets, each of the plurality of datasets requiring a predetermined minimum number of connect devices for access, wherein at least one of the plurality of datasets requires a different predetermined minimum number of connect devices than one or more of the other datasets of the plurality of datasets;
   storing, in a memory of the computing device, one or more device identifiers, wherein each device identifier is associated with a connected device separate from the computing device;
   receiving, by an input device interfaced with the computing device, a user instruction requesting use of at least one of the plurality of datasets;
   establishing, by the computing device, a connection to a recipient system for contactless communication of sensitive information including the at least one of the plurality of datasets;
   detecting, by the computing device, one or more active communication channels between the computing device and external connected devices separate from the computing device;
   identifying, for each of the detected one or more active communication channels, a device identifier associated with the respective external connected device;
   verifying, by the computing device, that at least one of the identified device identifiers is included in the one or more stored device identifiers and that a number of identified device identifiers included in the one or more stored device identifiers matches the predetermined minimum number of connected devices required for the at least one of the plurality of datasets; and
   transmitting, by a transmitter of the computing device, the at least one of the plurality of datasets to a recipient system after the verification.

2. The method of claim 1, further comprising:
   storing, in the memory of the computing device, the predetermined minimum number of connected devices for each of the plurality of datasets.

3. The method of claim 1, wherein the sensitive data is stored in a secure element of the computing device.

4. The method of claim 1, wherein the sensitive data is stored in a trusted execution environment in the memory of the computing device.

5. The method of claim 1, wherein the sensitive data is comprised of payment credentials associated with a transaction account used to fund electronic payment transactions.

6. The method of claim 1, wherein the one or more active communication channels use at least one of: Bluetooth, radio frequency, near field communication, and a local area network.

7. The method of claim 1, each of the one or more active communication channels is detected upon establishment of the respective active communication channel between the computing device and the respective external connected device.

8. A method for using an active connection of connected devices for additional security in the conveyance of sensitive data from a computing device, comprising:
   storing, in a computing device, sensitive data, the sensitive data including a plurality of datasets, each of the plurality of datasets requiring a predetermined minimum number of connect devices for access, wherein at least one of the plurality of datasets requires a different predetermined minimum number of connect devices than one or more of the other datasets of the plurality of datasets;
   receiving, by a receiver of the computing device, blockchain data for a blockchain, wherein the blockchain data includes at least one or more blockchain data entries, each blockchain data entry including one or more device identifiers, wherein each device identifier is associated with a connected device separate from the computing device;
   receiving, by an input device interfaced with the computing device, a user instruction requesting use of at least one of the plurality of datasets;
   establishing, by the computing device, a connection to a recipient system for contactless communication of sensitive information including the at least one of the plurality of datasets;
   detecting, by a processing device of the computing device, one or more active communication channels between the computing device and external connected devices separate from the computing device;
   identifying, for each of the detected one or more active communication channels, a device identifier associated with the respective external connected device;
   verifying, by the processing device of the computing device, that at least one of the identified device identifiers is included in the one or more blockchain data entries and that a number of identified device identifiers included in the one or more stored device identifiers matches the predetermined minimum number of connected devices required for the at least one of the plurality of datasets; and
   transmitting, by a transmitter of the computing device, the at least one of the plurality of datasets to a recipient system after the verification.

9. A system for using an active connection of connected devices for additional security in the conveyance of sensitive data from a computing device, comprising:
   a computing device configured to store sensitive data, the sensitive data including a plurality of datasets, each of the plurality of datasets requiring a predetermined minimum number of connect devices for access, wherein at least one of the plurality of datasets requires a different predetermined minimum number of connect devices than one or more of the other datasets of the plurality of datasets;
   a memory of the computing device configured to store one or more device identifiers, wherein each device identifier is associated with a connected device separate from the computing device;
   an input device interfaced with the computing device configured to receive a user instruction requesting use of at least one of the plurality of datasets;
   a processing device of the computing device configured to:
      establish a connection to a recipient system for contactless communication of sensitive information including the sensitive data;

detect one or more active communication channels between the computing device and external connected devices separate from the computing device, identify, for each of the detected one or more active communication channels, a device identifier associated with the respective external connected device, and verify that at least one of the identified device identifiers is included in the one or more stored device identifiers and that a number of identified device identifiers included in the one or more stored device identifiers matches the predetermined minimum number of connected devices required for the at least one of the plurality of datasets; and a transmitter of the computing device configured to transmit the sensitive data to the recipient system after the verification.

10. The system of claim 9, wherein the memory of the computing device is further configured to store the predetermined minimum number of connected devices for each of the plurality of datasets.

11. The system of claim 9, wherein the sensitive data is stored in a secure element of the computing device.

12. The system of claim 9, wherein the sensitive data is stored in a trusted execution environment in the memory of the computing device.

13. The system of claim 9, wherein the sensitive data is comprised of payment credentials associated with a transaction account used to fund electronic payment transactions.

14. The system of claim 9, wherein the one or more active communication channels use at least one of: Bluetooth, radio frequency, near field communication, and a local area network.

15. The system of claim 9, each of the one or more active communication channels is detected upon establishment of the respective active communication channel between the computing device and the respective external connected device.

16. A system for using the active connection of connected devices for additional security in the conveyance of sensitive data from a computing device, comprising:

a computing device configured to store sensitive data, the sensitive data including a plurality of datasets, each of the plurality of datasets requiring a predetermined minimum number of connect devices for access, wherein at least one of the plurality of datasets requires a different predetermined minimum number of connect devices than one or more of the other datasets of the plurality of datasets;

receiving, by a receiver of the computing device, blockchain data for a blockchain, wherein the blockchain data includes at least one or more blockchain data entries, each blockchain data entry including one or more device identifiers, wherein each device identifier is associated with a connected device separate from the computing device;

an input device interfaced with the computing device configured to receive a user instruction requesting use of at least one of the plurality of datasets;

a processing device of the computing device configured to
establish a connection to a recipient system for contactless communication of sensitive information including the at least one of the plurality of datasets;

detect one or more active communication channels between the computing device and external connected devices separate from the computing device, identify, for each of the detected one or more active communication channels, a device identifier associated with the respective external connected device, and verify that at least one of the identified device identifiers is included in the one or more blockchain data entries and that a number of identified device identifiers included in the one or more stored device identifiers matches the predetermined minimum number of connected devices required for the at least one of the plurality of datasets; and a transmitter of the computing device configured to transmit the at least one of the plurality of datasets to a recipient system after the verification.

* * * * *